Patented Sept. 20, 1938

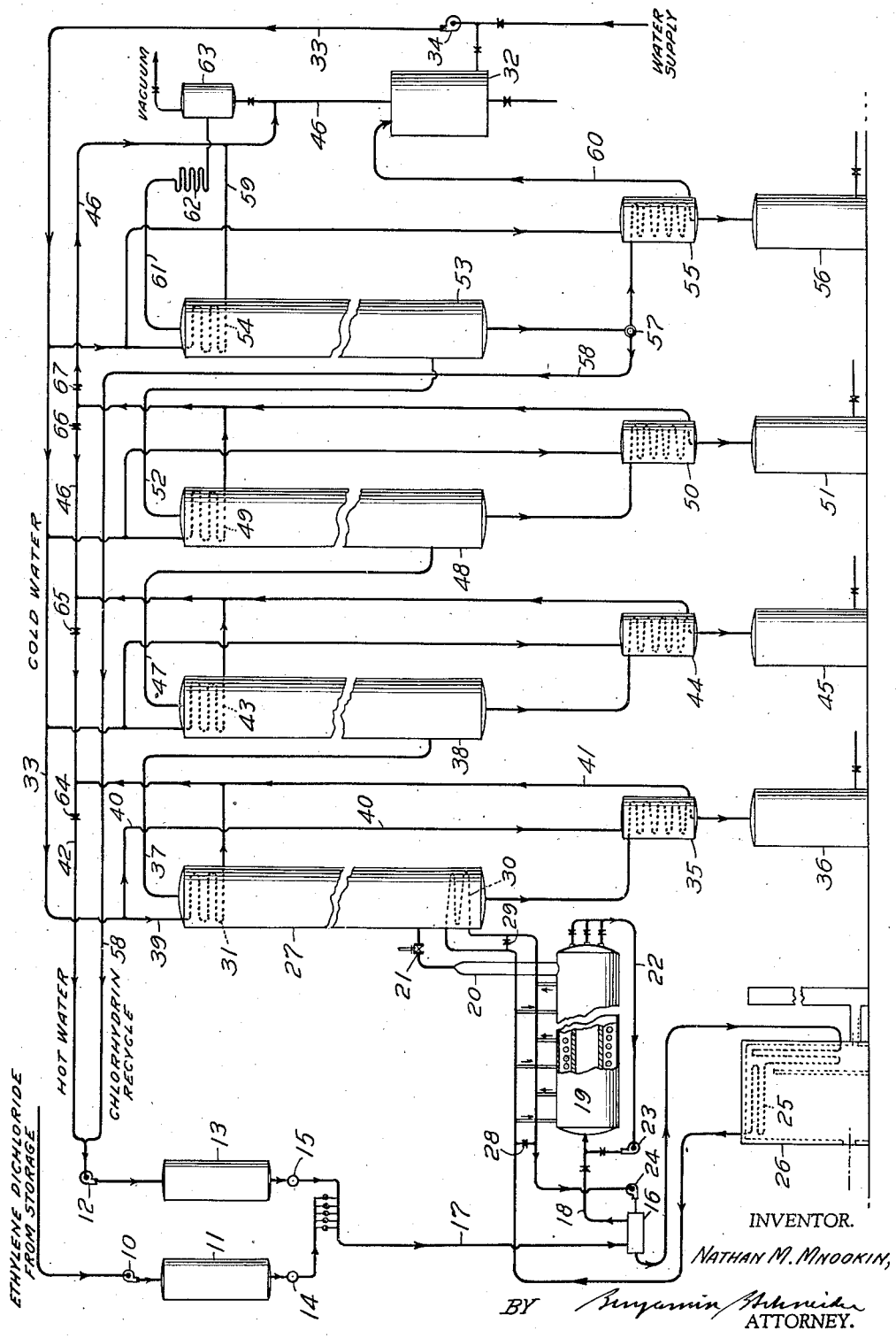

2,130,891

UNITED STATES PATENT OFFICE 2,130,891

PRODUCTION OF GLYCOLS

Nathan M. Mnookin, Kansas City, Mo., assignor to Synthetic Products, Inc., a corporation of Missouri Application September 21, 1936, Serial No. 101,751

24 Claims. (Cl. 260—636)

The present invention relates to improvements in methods for the hydrolysis of olefin halide compounds of the dihalide and halohydrin types; and more particularly to an economical, efficient and continuous process for the production of glycols and other polyhydric alcohols from olefin dihalides in which the halohydrin formed during the reaction is continuously segregated and returned to the system for further treatment and completion of the reaction. The present invention is a continuation-in-part of my prior copending application Serial No. 546,917, filed June 25, 1931, which has matured into Patent No. 2,056,976.

Hitherto, in the production of glycols or other polyhydric alcohols by the hydrolysis of olefin dihalides, chlorhydrins and the like, the reaction has been effected in the presence of weak alkalies or of soaps of strong bases and weak acids such as the alkali and alkaline earth metal carbonates, bicarbonates, acetates, formates, phosphates and the like; but the reactions have been complicated and the yields reduced by side reactions and polymerizations resulting in the formation of vinyl compounds, resinous bodies, and other undesirable by-products.

I have discovered that the undesirable side reactions and formation of undesired by-products may be avoided and a much increased, almost quantitative yield of the desired hydroxy-bodies secured by effecting the hydrolysis of olefin halide compounds or halohydrins in the presence of an acid while maintaining superatmospheric pressure and elevated temperature conditions. By operating in accordance with the present invention I am able to secure yields of the polyhydric alcohol desired exceeding 90% and in general to the amount of 95% or more of the theoretical yield. The side reactions, with the formation of vinyl halides, resinous and tarry polymerization products and other undesired by-products are substantially completely eliminated and the expense of operation is markedly reduced.

The reaction in accordance with the present invention may be illustrated in connection with its specific application to the production of glycol from ethylene dichloride and ethylene chlorhydrin.

In accordance with the present invention, ethylene dichloride is heated with an excess of water, say at least five times its volume and preferably about fifteen times its volume, the water being preferably slightly acidulated, suitably with hydrochloric acid. Other acids, such as sulfuric acid, acetic acid, phosphoric acid or the like may be employed but the use of hydrochloric acid is preferred, as it is one of the products of reaction. The proportion of acid used is very slight, say one-half to one part of N/10 acid to 100 parts by volume of ethylene dichloride and 1500 parts by volume of water, or the acid may be entirely omitted. The reacting materials are then heated under pressure to a temperature of at least 125° C., and preferably above 135° C. The temperature may be carried as high as 200° C. or even higher, but in general temperatures above 200° C. are undesirable, as they result in side reactions with the formation of various polymerizations and decomposition products. I have found temperatures of the order of 160° to 175° C. most desirable in use.

The speed of the reaction may likewise be accelerated by use of catalysts, as hereinafter more fully set forth.

In carrying out the reaction, the mixture of constituents in the pressure receptacle is heated to the desired temperature, which is maintained until the reaction is completed. During the course of the reaction, the pressure in the receptacle rises, say to 225 lbs. or even higher, and then gradually diminishes as the reaction proceeds, finally dropping to 175 lbs. or lower. After completion of the reaction, the vessel is cooled and the reaction mixture is found to be present as a clear aqueous liquid. The ethylene dichloride is completely consumed and undesirable side products, such as aldehydes, tarry decomposition products and the like are negligible in amount. On distillation, the recovery of glycol is very close to theoretical, in excess of 90% and in general of 95% of the theoretical yield being secured. The chlorine of the ethylene dichloride is found to be substantially entirely present as hydrochloric acid. The hydrochloric acid may be neutralized, as with lime, to form a valuable by-product or may be utilized in any suitable manner.

If desired, the reaction may be halted at an intermediate point or on occasions it may be necessary to stop it before completion. In such cases, the reaction mixture will be found to contain glycol and chlorhydrin. By reacting on the chlorhydrin with an excess of water in the same manner, the conversion into glycol may be completed.

As indicated above, hydrochloric acid is one of the products of reaction. If desired, the reaction may be initiated with the chlor-compound and water alone, the halogen acid resulting from hydrolysis developing the acidity required for proper conduct of the reaction. However, under these circumstances, before the development of the slight acidity necessary for the prevention of side reactions, a minute proportion of undesired compounds, such as vinyl halides may be produced. To avoid these side reactions, it is preferred that the reaction mixture be acidulated at the beginning.

The conditions of reaction above described are applicable to other olefin halide compounds of the classes of polyhalides and halohydrins, such as trimethylene dibromide or dichloride, propylene chlorhydrin, trichloropropane and the like.

The rate of reaction may be increased and the time required for its completion shortened by the presence in the reaction mixture of heavy metals and of compounds thereof. Thus titanium, titanium oxide, vanadium, vanadium chloride, gold, silver, platinum, mercury and their soluble or insoluble salts have been found to markedly accelerate the reaction. The metals or insoluble compounds thereof are preferred, since they may be more readily separated from the reaction mixture. The heavy metals of the first and second groups, such as silver, gold, and mercury, and those of the gold period, such as osmium, platinum, gold and mercury have been found particularly effective. Thus, by incorporating in the reaction mixture above specifically set forth a strip of metallic gold or gold filings, the rate of reaction may be markedly accelerated and the reaction completed in two to two and one-half hours at temperatures of 160° to 170° C.

As hereinbefore indicated, minute proportions of aldehydes may be found in the reaction mixture at the end of the reaction. I have found that the slight oxidation resulting in the formation of these aldehydes may be largely or entirely prevented by incorporating a very small amount of a reducing agent in the reaction mixture, such as metallic magnesium, iron or zinc, sodium bisulfite, potassium metabisulfite, acid sodium phosphate or the like. In reacting upon the higher homologues of the ethylene dihalides or ethylene halohydrins for the production of higher polyhydric alcohols, it is found that the reaction requires a somewhat longer time and the most desirable temperatures for operation are somewhat higher than with the corresponding ethylene compounds. Thus, in reacting upon trimethylene dichloride, although the reaction proceeds at temperatures from 125 to 135° C. up, my preferred temperatures of operation are in the order of 175 to 185° C. and a somewhat longer period of time is required for completion of the reaction. In general, a less time for reaction is required when the halohydrins are employed than when the polyhalides are used.

The use of considerable excesses of water appear to inhibit decomposition and polymerization and reduce the formation of tarry and resinous bodies. Thus, although the reaction may be satisfactorily conducted with a volume of water five to ten times as great as the volume of the halohydrin, it is preferred to employ a volume of water at least approximately 10 to 15 times as great as that of the volume of the halogen compound or even greater.

In accordance with the present invention the reaction may likewise be conducted continuously either with or without pressure, by passing steam, preferably superheated, with acid vapors such as hydrochloric acid vapors and ethylene dichloride vapors through a continuous passage or coil in which a temperature in excess of 125 to 135° C. and preferably of 160° to 175° C. is maintained. The coil may suitably be packed with any refractory packing material, such as ceramic material, glass balls or the like, preferably interspersed or coated with catalysts of the character hereinbefore set forth, such as vanadium oxide or gold in the form of filings or a plating. In general, in operating in this manner, a higher temperature is employed than in batch operation as hereinbefore described. For example, temperatures as high as 200° C. may be used.

This continuous embodiment of my invention will now be described in greater detail in conjunction with the accompanying flow sheet, wherein a lay-out of apparatus suitable for carrying out my invention is diagrammatically shown.

The olefin dihalide, as for example, ethylene dichloride, is forced by pump 10, from any suitable source of supply to a pressure feed tank 11. Heated water, preferably acidulated as hereinbefore described, from any suitable source of supply, is pumped by a pump 12, to a pressure feed tank 13. These liquids in the tanks 11 and 13 are maintained under sufficient pressure to secure the proper feed. Predetermined amounts of ethylene dichloride and heated acidulated water, are then metered under pressure through the meters 14 and 15 respectively, to a heat exchanger 16 through a common line 17. In general, the reacting constituents are controlled so as to be maintained in the same relative proportions as hereinbefore set forth in connection with the batch operation. The mixture of ethylene dichloride and acidulated water is thus brought to a temperature at which a reaction may begin and the mixture then flows through the line 18 into the reaction chamber 19. The reaction chamber is maintained at a temperature in excess of 125 to 135° C. and preferably at 160 to 175° C., although temperatures as high at 200° C. may be used. This chamber may, if desired, be packed with refractory material, preferably interspersed or coated with a catalyst as hereinabove set forth. The chamber is also lined with such catalytic material, preferably silver. The reaction of the mixture there takes place under heat and pressure. Reaction products, in vapor form, then flow through the column 20 wherein entrainment is separated and some reflux occurs, and then through a pressure reducing valve 21. The vapors are then subjected to fractionation, preferably under vacuum in a manner to be described. If desired, a circulating line 22 and a pump 23 may be provided for recirculating the reaction mixture and reacted products through the reaction chamber 19. This is advisable at the start of the operation, and has been found to be desirable throughout the reaction to build up the available concentration of glycol in this reaction mixture.

The line 22 is provided with valved openings at different levels into chamber 19, for withdrawal of its contents at one or more levels. Thus either one or both of the two upper valves may be opened while maintaining the lower one closed to recirculate the aqueous reaction products through the line 22 and the reaction chamber 19; or, if desired, all the valves may be opened and unconsumed ethylene dichloride and aqueous reaction mixture may be recirculated in the desired controlled proportions, for example, in initially bringing the reaction mixture to the desired reaction condition.

The reaction chamber may be heated to the desired temperature by any suitable means, as by a coil through which flows a circulating heated fluid as for example, oil, diphenyl or the like. The heating medium is circulated in the direction of the arrows in a closed circuit, as by pump 24 through the heating coils 25 in a furnace 26, through the coils surrounding the reaction chamber 19, through the heat exchanger 16 and back to the heating coils. A portion of the heated oil entering the reaction chamber may be diverted in any suitable manner to the lower part of a dephlegmating tower or column 27, through a coil or reboiler 30, wherein it reheats condensate formed in the column 27 as hereinafter described. Suitable by-passes 28 and 29 may be provided in the closed heating line for the purpose of controlling the temperature of the reaction chamber 19 and the reboiler 30 respectively.

The apparatus so far described (up to the pressure reducing valve 21) constitutes the high pressure side of the apparatus wherein a pressure in the order of, for example, 200–225 lbs. per square inch and a temperature in excess of 125 to 135° C. and up to 200° C. may be maintained. The apparatus to the right of the pressure reducing valve constitutes the low pressure side wherein a pressure in the order of, for example, 20–30 lbs. or lower, or a vacuum may be maintained.

As stated above, vapor reaction products leave the reaction chamber through column 20 and pass through the reducing valve 21 into the low pressure side of the apparatus. These vapor reaction products then pass into the dephlegmating column 27 wherein the higher boiling point vapors are condensed, a cooling medium being passed through a cooling coil 31 in the upper part of column 27. The cooling medium may be cold acidulated water supplied wholly or in part from a collector or cooler 32, through a main water supply line 33, and a line 39 tapped therefrom, in any desirable manner, as by a pump 34. The olefin polyhydroxide condensate, as for example ethylene glycol, usually with some water, flows from the dephlegmating tower 27 through water cooler 35 and subsequently into a glass-lined or non-corrodible storage tank 36. The top temperature maintained in column 27 by the water flowing through the coil 31 is preferably low enough to condense out substantially all of the ethylene glycol contained in the vapors. Lower boiling constituents are stripped from the glycol or glycol solution in the base of tower 27 by suitable control of its temperature by reheater coil 30. The uncondensed vapors rise in the dephlegmating tower 27 and pass through a line 37 into a second dephlegmating column 38.

Water may be supplied to the cooler 35 through a line 40 tapped from the line 39. This water becomes heated by indirect heat exchange with the condensate flowing through the cooler 35 and is passed through a line 41 wherein it is mingled with the heated water flowing from the coil 31. This combined stream of acidulated water has a temperature in the order of say 75° to 85° C. and is introduced, through a suitable valve arrangement, into the system through the line 42 leading to the intake of pump 12.

The uncondensed vapors issuing from the tower 27 are introduced into the tower 38, wherein the high boiling vapors are condensed, suitable temperatures being maintained by a cooling coil 43 through which water, tapped from the cold water supply line 33, flows. The condensed vapors, an aqueous solution of hydrochloric acid of about 20% concentration, flows from the tower 38 through a cooler 44 and subsequently into a rubber-lined or non-corrodible storage tank 45. The cooler 44 is supplied with cold water from the supply line 33 and the heated water issuing therefrom is mingled with the water issuing from the coil 43 and may flow through lines 46 and 42 to the intake of pump 12 or directed to cooler or collector 32 as hereinafter described.

The uncondensed vapors issuing from the tower 38 pass through a line 47 into a dephlegmating tower 48, in which a dilute aqueous solution of hydrochloric acid, is condensed, the proper tower temperature being maintained by a cooling coil 49 supplied with water through a line tapped from the main supply line 33. The condensate flows through a cooler 50, cooled by water from the line 33, and subsequently into a rubber-lined or non-corrodible storage tank 51. The water issuing from the coil 49 and the cooler 50 is mingled and introduced into the line 46.

The mingled streams of water from coil 43 and cooler 44 and coil 49 and cooler 50 may be introduced into the system through the intake of pump 12 along with the water from line 41 or may be diverted to the cooler 32. To accomplish this I may suitably provide a valve 64 and valves 65, 66 and 67 in the lines 42 and 46 respectively to effect this arrangement. Thus if valve 65 is closed and valves 64, 66 and 67 open, the water from line 41 will flow to the intake of pump 12 through line 42 and the water issuing from the coil 43 and cooler 44 and coil 49 and cooler 50 will flow through line 46 to the cooler or collector 32. Now if valve 65 is opened and valve 66 is closed, the water from the coil 43 and cooler 44 will flow through the lines 46 and 42 to the intake of pump 12 and the water from coil 49 and cooler 50 will flow to cooler 32. If valves 64, 65 and 66 are open and valve 67 closed, it is obvious that all of the water from line 41, coil 43 and cooler 44 and coil 49 and cooler 50 will flow through the system. It is apparent that the flow of water to the system, from the coils and coolers, may be controlled at will and to suit the desired need by a simple adjustment of the valves.

The uncondensed vapors issuing from the tower 48 pass through a line 52 in a dephlegmating tower 53. These vapors now consist primarily of ethylene chlorhydrin, unconsumed ethylene dichloride carried over by steam distillation, and some water. In the tower 53 the ethylene chlorhydrin and unconsumed ethylene dichloride are condensed, the required temperature being maintained by the cooling coil 54 which is supplied with water from the line 33. The condensate flows into a water cooler 55, cooled by water from the line 33, and subsequently into a rubber-lined or non-corrodible storage tank 56. If desired, this condensate may be returned to the feed tank 13 along with the fresh charge of heated water, and thus into the system, by means of a valve 57 and a line 58. The water issuing from the coil 54 is returned to the cooler 32 through a line 59 and line 46 and the water from the cooler 55 is returned directly to the cooler 32 through a line 60.

The vapor issuing from the tower 53, substantially all water vapor, flows through a line 61 to a condenser 62, wherein it is condensed and the condensate to a receiver 63 and subsequently to the cooler 32. The vent of receiver 63 may be vented to the atmosphere or connected to a suitable vacuum producing apparatus as for example, a vacuum pump (not shown) which operates continuously on the system so that the low pressure side thereof is maintained at a relatively low pressure, say atmospheric or at a vacuum in the order of 10 to 20 in. In this manner, fractional separation of the constituents takes place at a relatively low pressure.

The heated water from the coils 43, 49 and 54 and the water coolers 44, 50 and 55 is returned to the cooler 32, although it may be introduced into the system by a suitable control of the valves, in the manner above described, along with the water from the coil 31 and the cooler 35. I prefer the former arrangement however, because the initial acidity of the water as well as the temperature, may be more readily controlled in the cooler 32. Suitable arrangements can be provided in connection with the cooler 32 to control the acidity of the water therein, the temperature thereof and to replace the water consumed in the system.

The process of my invention may be carried out in a continuous manner. Thus, in accordance with this invention, ethylene dichloride is heated under pressure with an excess of water, say at least ten times its volume and preferably about fifteen to twenty times its volume and the mixture heated under pressure in the reaction chamber 19 until uniform reaction has taken place. The vapor reaction products are then subjected to fractional condensation under reduced pressure to remove the various constituents of the vapors as for example the glycol, the acid in aqueous solution and the ethylene chlorhydrin and any unconsumed ethylene dichloride. The ethylene chlorhydrin and unconsumed ethylene dichloride may be returned to the system through the line 58 for further treatment and completion of the reaction in the manner described.

In operating the process, I prefer to utilize a ratio of water to ethylene dichloride of say 10 to 1, or higher. The ethylene dichloride and water are supplied in the desired proportions for tanks 11 and 13 and the chlorhydrin formed in the system is recycled. The reaction mixture is passed slowly through the reaction chamber, say in the order of about 60 minutes, in order to insure uniform reaction, and the aqueous reaction products may, if desired, be recycled in the manner described above. If desired, the acid from the tanks 45 and 51 may be adjusted to the desired acidity and recycled with the incoming stream of reagents. As stated above, the acidulation of the reaction mixture at the beginning of the operation is desirable for the purpose of preventing the formation of undesired compounds, such as vinyl compounds and the like.

In carrying out the reaction as hereinbefore described, the aqueous reaction mixture resulting from the reaction has a relatively low proportion of glycol present, which must be separated in the low pressure distillation process. It has been found in accordance with the present invention that the concentration of glycol in the reaction mixture may be readily increased by slowly and progressively adding the ethylene dichloride to the water in the reaction chamber. In this semi-continuous or progressive feeding operation, the proportion of ethylene dichloride consumed is increased, and there is a corresponding increase of glycol formed in a given quantity of aqueous liquid present in the reaction mixture while maintaining high efficiency of glycol formation, notwithstanding the progressively increasing acid concentration of the aqueous reaction mixture. In carrying out the reaction in this manner, the ethylene dichloride may be added to the aqueous reaction mixture in aliquot or approximately aliquot proportions or may be added slowly and continuously as the ethylene dichloride present is consumed, thus maintaining a desired ratio or proportion between the ethylene dichloride and aqueous liquid present in the reaction mixture. Thus by adding the ethylene dichloride in this manner, and maintaining a ratio of between 9:1 and 10:1 of aqueous liquid to ethylene dichloride, I have been able to build up the glycol concentration of the aqueous liquid to approximately 10 to 15% while maintaining a high yield efficiency notwithstanding the increase of the acid concentration to approximately 17 to 20% HCl in the same period.

Thus, in carrying out the reaction in the apparatus disclosed in the drawing, the aqueous liquid, which may include chlorhydrins and acid derived from previous operation as previously described, may be charged into reaction vessel 19 with a suitable proportion of ethylene dichloride to establish a desired ratio of say about 10 to 1. Reaction is initiated as heretofore described, with or without recirculation of the reaction mixture. It is then continued under the temperature and pressure conditions heretofore set forth and without withdrawal of liquid or vapor products, with continuous or intermittent introduction of additional ethylene dichloride as the dichloride is consumed, until a desired concentration of glycol, say 10% or higher, is secured in the aqueous liquid. The supply of ethylene dichloride may then be discontinued, the unconsumed dichloride withdrawn, and the products distilled from the reaction chamber and fractionally condensed as heretofore described.

I claim:

1. In the method of producing glycol, the steps comprising admixing ethylene dichloride with water, heating a body of the mixture under pressure to a temperature in excess of 125° C. in a closed vessel, withdrawing aqueous reaction products from said vessel and recycling the aqueous reaction products through said vessel.

2. In the method of producing glycol, the steps comprising admixing ethylene dichloride with water, heating a body of the mixture under pressure to a temperature in excess of 125° C. in a closed vessel, withdrawing aqueous reaction products and unconsumed ethylene dichloride from said vessel and recycling them through said vessel.

3. In the method of producing glycol, the steps comprising admixing ethylene dichloride with water, heating a body of the mixture under pressure to a temperature in excess of 125° C. in a closed vessel, withdrawing aqueous reaction products and unconsumed ethylene dichloride in controlled proportions from said vessel and recycling them through said vessel.

4. In the method of producing glycol, the steps comprising admixing ethylene dichloride with water, heating a body of the mixture under pressure to a temperature in excess of 125° C. in a closed vessel, and in the presence of free acid, withdrawing aqueous reaction products from said vessel and recycling the aqueous reaction products through said vessel.

5. In the method of producing glycol, the steps comprising admixing ethylene dichloride with water, heating a body of the mixture under pressure to a temperature in excess of 125° C. in a closed vessel, and in the presence of free acid, withdrawing aqueous reaction products and unconsumed ethylene dichloride from said vessel and recycling them through said vessel.

6. The method of producing glycol which comprises admixing ethylene dichloride with water, heating a body of the mixture under pressure to a temperature in excess of 125° C. in a closed vessel, withdrawing aqueous reaction products from said vessel and recycling them through said vessel and simultaneously withdrawing vaporous reaction products from said vessel, removing hydrolyzed products from said vaporous reaction products, separating chlorhydrins therefrom and returning the chlorhydrins to the said body of the mixture.

7. The method of producing glycol which comprises admixing ethylene dichloride with water, heating a body of the mixture under pressure to a temperature in excess of 125° C. in a closed vessel, and in the presence of free acid, withdrawing aqueous reaction products from said vessel and recycling them through said vessel and simultaneously withdrawing vaporous reaction products from said vessel, removing hydrolyzed products from said vaporous reaction products, separating chlorhydrins therefrom and returning the chlorhydrins to the said body of the mixture.

8. The method of producing glycol which comprises admixing ethylene dichloride with water, heating a body of the mixture to a temperature in excess of 125° C. to form a vaporous reacted mixture, withdrawing the vaporous reacted mixture and removing hydrolyzed products therefrom, separating chlorhydrins from said hydrolyzed products and returning the chlorhydrins to the said body of the mixture.

9. The continuous method of producing glycol which comprises admixing ethylene dichloride with water, heating a body of the mixture under pressure to a temperature in excess of 125° C. to form a vaporous reacted mixture, withdrawing the vaporous reacted mixture and removing hydrolyzed products therefrom, separating chlorhydrins from said hydrolyzed products and returning the chlorhydrins to the said body of the mixture.

10. The method of producing glycol which comprises forcing into a reaction vessel a continuous stream of ethylene dichloride and water, the volumetric proportion of the water being from 10 to 20 times that of the ethylene dichloride, maintaining a body of said mixture in the reaction vessel at a temperature of 160 to 175° C., whereby glycols, free hydrochloric acid and chlorhydrin are formed in said reaction mixture, and conducting said reaction without diminution of hydrochloric formed by neutralization, withdrawing from the reaction vessel a continuous stream of vaporous reaction products, separating from the stream thus withdrawn the glycol and chlorhydrin to the chamber with the entering stream of reagents for further treatment in an acid reaction mixture and formation of additional glycol.

11. The method of producing glycol which comprises forcing into a reaction vessel a continuous stream of ethylene dichloride and water, the volumetric proportion of the water being from 10 to 20 times that of the ethylene dichloride, maintaining a body of said mixture in the reaction vessel at a temperature above 135° C. and below 200° C. and at a pressure of 200-225 lbs. per square inch, whereby glycols, free hydrochloric acid and chlorhydrin are formed in said reaction mixture, and conducting said reaction without diminution of hydrochloric formed by neutralization, withdrawing from the reaction vessel a continuous stream of vaporous reaction products, separating from the stream thus withdrawn the glycol and chlorhydrin and returning the chlorhydrin to the chamber with the entering stream of reagents for further treatment in an acid reaction mixture and formation of additional glycols.

12. The method of producing glycol which comprises forcing into a reaction vessel a continuous stream of ethylene dichloride and water, the volumetric proportion of the water being from 10 to 20 times that of the ethylene dichloride, maintaining a body of said mixture in the reaction vessel at a temperature of 160 to 175° C. and at a pressure of 200-225 lbs. per square inch, whereby glycols, free hydrochloric acid and chlorhydrin are formed in said reaction mixture, and conducting said reaction without diminution of hydrochloric formed by neutralization, withdrawing from the reaction vessel a continuous stream of vaporous reaction products, separating from the stream thus withdrawn the glycol and chlorhydrin and returning the chlorhydrin to the chamber with the entering stream of reagents for further treatment in an acid reaction mixture and formation of additional glycol.

13. The method of producing glycol which comprises forcing into a reaction vessel a continuous stream of ethylene dichloride and water, the volumetric proportion of the water being 15 times that of the ethylene dichloride, maintaining a body of said mixture in the reaction vessel at a temperature above 135° C. and below 200° C., whereby glycols, free hydrochloric acid and chlorhydrin are formed in said reaction mixture, and conducting said reaction without diminution of hydrochloric formed by neutralization, withdrawing from the reaction vessel a continuous stream of vaporous reaction products, separating from the stream thus withdrawn the glycol and chlorhydrin and returning the chlorhydrin to the chamber with the entering stream of reagents for further treatment in an acid reaction mixture and formation of additional glycol.

14. The method of producing glycol which comprises forcing into a reaction vessel a continuous stream of ethylene dichloride and water, the volumetric proportion of the water being 15 times that of the ethylene dichloride, maintaining a body of said mixture in the reaction vessel at a temperature of 160 to 175° C., whereby glycols, free hydrochloric acid and chlorhydrin are formed in said reaction mixture, and conducting said reaction without diminution of hydrochloric formed by neutralization, withdrawing from the reaction vessel a continuous stream of vaporous reaction products, separating from the stream thus withdrawn the glycol and chlorhydrin and returning the chlorhydrin to the chamber with the entering stream of reagents for further treatment in an acid reaction mixture and formation of additional glycol.

15. The method of producing glycol which comprises admixing continuous streams of ethylene dichloride and water, heating a body of the mixture under pressure to a temperature in excess of 135° C. in the presence of free acid, withdrawing vaporous reaction products therefrom, separating chlorhydrin from said reaction products at a relatively lower temperature and pressure and returning the chlorhydrin with the entering stream of reagents for further treatment.

16. The method of producing glycol which comprises admixing continuous streams of ethylene dichloride and water, heating a body of the mixture to a temperature in excess of 135° C. and at a pressure of from 200–225 lbs. per square inch, withdrawing reaction products therefrom, separating chlorhydrin from said reaction products at a temperature below 135° C. and at a pressure of from 20–30 lbs. per square inch and returning the chlorhydrin with the entering stream of reagents for further treatment.

17. The method of producing glycol which comprises admixing continuous streams of ethylene dichloride and water, heating a body of the mixture to a temperature in excess of 135° C. and at a pressure of from 200–225 lbs. per square inch in the presence of free acid, withdrawing reaction products therefrom, separating chlorhydrin from said reaction products at a temperature below 135° C. and at a pressure of from 20–30 lbs. per square inch and returning the chlorhydrin with the entering stream of reagents for further treatment.

18. The method of producing glycol which comprises admixing ethylene dichloride with water, heating a body of the mixture under pressure to a temperature in excess of 125° C., withdrawing vaporous reacted mixture and removing hydrolyzed products therefrom, separating chlorhydrins from said hydrolyzed products and returning the chlorhydrins to the said body of the mixture.

19. The method of producing glycol which comprises admixing ethylene dichloride with water, heating a body of the mixture under pressure to a temperature in excess of 125° C. in the presence of free acid, supplying additional ethylene dichloride and water to the mixture, withdrawing vaporous reaction products therefrom, removing hydrolyzed products from the separated reaction mixture, separating chlorhydrins from said hydrolyzed products, and returning the chlorhydrins to the said body of the mixture.

20. The method of producing glycol which comprises forcing into a reaction vessel a continuous stream of ethylene dichloride and water, the volumetric proportion of the water being from 10 to 20 times that of the ethylene dichloride maintaining a body of said mixture in the reaction vessel at a temperature above 135° C. and below 200° C., whereby glycols, free hydrochloric acid and chlorhydrin are formed in said reaction mixture, and conducting said reaction without diminution of hydrochloric formed by neutralization, withdrawing from the reaction vessel a continuous stream of the vaporous reaction products, separating from the stream thus withdrawn the glycol and chlorhydrin and returning the chlorhydrin to the chamber with the entering stream of reagents for further treatment in an acid reaction mixture and formation of additional glycol.

21. In the method of producing glycol, the steps comprising reacting a desired ratio of ethylene dichloride and an aqueous liquid in a reaction chamber while maintaining the reactants under pressure and at a temperature in excess of 125° C., slowly feeding ethylene dichloride to the reaction chamber to replace the ethylene dichloride consumed in the reaction and thereby maintain the desired ratio between the reactants, and subsequently removing reaction products from said chamber.

22. In the method of producing glycol, the steps comprising reacting a desired ratio of ethylene dichloride and an aqueous liquid in a reaction chamber while maintaining the reactants under pressure and at a temperature in excess of 125° C., slowly and continuously feeding ethylene dichloride to the reaction chamber to replace the ethylene dichloride consumed in the reaction and thereby maintain the desired ratio between the reactants, and subsequently removing reaction products from said chamber.

23. In the method of producing glycol, the steps comprising reacting a desired ratio of ethylene dichloride and an aqueous liquid in a reaction chamber while maintaining the reactants under pressure and at a temperature in excess of 125° C., slowly feeding ethylene dichloride to the reaction chamber to replace the ethylene dichloride consumed in the reaction and thereby maintain the desired ratio between the reactants, and subsequently removing vaporous reaction products from said reaction chamber.

24. In the method of producing glycol, the steps comprising reacting a desired ratio of ethylene dichloride and an aqueous liquid in a reaction chamber while maintaining the reactants under pressure and at a temperature in excess of 125° C., slowly and continuously feeding ethylene dichloride to the reaction chamber to replace the ethylene dichloride consumed in the reaction and thereby maintain the desired ratio between the reactants, and subsequently removing vaporous reaction products from said chamber.

NATHAN M. MNOOKIN.